United States Patent [19]

Blanchard

[11] Patent Number: 4,986,602
[45] Date of Patent: Jan. 22, 1991

[54] IRREVERSIBLE CONTINUOUS PIVOTAL CONNECTION

[75] Inventor: Jean-Marie Blanchard, Nogent/Vernisson, France

[73] Assignee: Tubauto, Levallois-Perret, France

[21] Appl. No.: 310,358

[22] Filed: Feb. 14, 1989

[30] Foreign Application Priority Data

Feb. 23, 1988 [FR] France .................................. 88 02141

[51] Int. Cl.⁵ .............................................. B16N 1/06
[52] U.S. Cl. ........................................ 297/362; 403/91; 403/92; 403/93
[58] Field of Search ............................. 403/91, 92, 93; 297/361, 362, 367, 355; 74/409, 805

[56] References Cited

U.S. PATENT DOCUMENTS

| 3,779,655 | 12/1973 | Toyota ................................ 403/93 |
| 4,211,451 | 7/1980 | Shepard .............................. 297/362 |
| 4,345,792 | 8/1982 | Shepard .............................. 297/362 |
| 4,371,207 | 2/1983 | Wilking et al. ................. 297/362 X |
| 4,668,013 | 5/1987 | Wahlmann ........................ 297/362 |
| 4,781,416 | 11/1988 | Johnson et al. ................... 297/362 |
| 4,887,863 | 12/1989 | Caillol ................................ 297/362 |

FOREIGN PATENT DOCUMENTS

| 0121452 | 2/1984 | European Pat. Off. . |
| 1680242 | 8/1974 | Fed. Rep. of Germany . |
| 1590551 | 4/1970 | France . |
| 2467729 | 4/1981 | France . |
| 1535464 | 12/1978 | United Kingdom . |
| 2049027 | 12/1980 | United Kingdom . |
| 2073311 | 10/1981 | United Kingdom . |

Primary Examiner—Randolph A. Reese
Assistant Examiner—Franco S. Deliguori
Attorney, Agent, or Firm—Oblon, Spivak, McClelland, Maier & Neustadt

[57] ABSTRACT

An irreversible continuous pivotal connection between a fixed part and a movable part includes a fixed side plate fixed with respect to the fixed part and having an arcuate array of teeth, as well as a movable side plate fixed with respect to the movable part and having an arcuate array of teeth. The movable side plate is mounted parallel to the fixed side plate for rotation about a fixed common axis. A planet gear is positioned between the fixed and movable side plates, and has two external arcuate arrays of teeth with different diameters and locally meshing with the arcuate arrays of teeth of the fixed and movable side plates. An eccentric member is mounted for rotation about the fixed axis and presses on the planet gear so that rotation of the eccentric member in one direction causes epicyclic rotation of the planet gear in another direction. A locking disk is rotatably fixed relative to the eccentric member and is positioned between the planet gear and one of the fixed and movable side plates, so that a torque applied to the movable side plate with respect to the fixed axis causes a wall of the planet gear facing that of the locking disc to rock from an initial plane by an amount sufficient to come into locking contact locally against the wall of the locking disc.

12 Claims, 2 Drawing Sheets

IRREVERSIBLE CONTINUOUS PIVOTAL CONNECTION

BACKGROUND OF THE INVENTION

1. Field of the Invention

The invention concerns pivotal connections which are used primarily for adjustment of the angle of inclination of the backrest part of a seat with respect to the seat part. It is applied in particular to vehicle seats, for example those which are used in motor vehicles.

2. Background of the Related Art

Different types of pivotal connections which involve continuous adjustment are known, in particular those described in French Pat. No. 1.590.551. That document describes three embodiments of continuous pivotal connections comprising a planet gear which cooperates by meshing engagement with two ring gears. One of the ring gears is fixed with respect to the backrest part of the seat by way of a suitable fitting and the other is fixed with respect to the seat part, also by means of another fitting. A control member drives the planet gear by way of a shaft which rotates an eccentric and the planet gear rotates the movable ring gear which is fixed with respect to the backrest part, relative to the fixed ring gear which is fixed with respect to the seat part. That thus provides for adjustment of the inclination of the backrest part.

It is stated in said document that with the use of an epicyclic train means, the continuous pivotal connection described is irreversible, that is to say, it is not possible to cause rotary movement of one of the ring gears with respect to the other, without acting on the control member which actuates the eccentric. That means that if an attempt is made to turn the movable ring gear by acting for example on the backrest part, the pivotal connection is automatically locked. It has been found that two embodiments described in that document are in fact irreversible. The pivotal connections corresponding to those two embodiments have the common characteristic that the planet gear comprises a single tooth array, the teeth of which are of a sufficient width to mesh at the same time with the two tooth arrays of the ring gears which are disposed in side-by-side relationship, in the meshing zone. Thus, a couple, i.e., a rotating torque, which is applied to the movable ring gear, for example by virtue of a thrust applied to the backrest part, creates at the single tooth array of the planet gear a drive couple which is opposed by a resisting couple which is equal and opposite, being produced at that same tooth array of the planet gear by the fixed ring gear.

Experience has shown however that the two pivotal connection constructions comprising a planet gear with a single tooth array suffer from disadvantages. In fact, the first embodiment uses two rings gears which are mounted on a common axis having tooth arrays of the same diameters but with different numbers of teeth which mesh with the single tooth array, and that gives rise to play and wear. In the second embodiment the diameters of the tooth arrays of the ring gears are different but one of the two is driven by an eccentric about the axis of the other in such a way that, in the meshing zone of the planet gear, the single tooth array thereof does in fact co-operate with the two tooth arrays of the ring gears. This substantially increases the degree of complexity of the pivotal connection and also gives rise to increased wear and play. In the third embodiment described in the above-indicated document the two ring gears are mounted on a common axis and have inwardly directed tooth arrays of different diameters. The planet gear has two tooth arrays which are disposed in side-by-side relationship, which are of different diameters and which are directed outwardly, the dimensions thereof being such that, under the action of the eccentric, they simultaneously mesh with the corresponding tooth arrays of the two ring gears.

The last-mentioned embodiment of the continuous pivotal connection for a seat has advantages in terms of simplicity of design in comparison with those described above, but, contrary to what French Pat. No. 1.590.551 states, it is not irreversible if the difference in diameter between the two tooth arrays of the planet gear becomes appreciable. It will be appreciated that the drive torque which is possibly applied by the movable ring gear is in fact no longer balanced by the resisting torque opposed by the fixed ring gear, the lever arms with respect to the common axis being different.

The degree of reversibility of this last-mentioned embodiment increases in proportion to an increasing ratio between the diameters of the two tooth arrays of the planet gear. In practice, it may be an attractive proposition to increase that ratio so as to permit relatively rapid adjustment of the angle of inclination of the backrest part, which does not require a large number of turns of the eccentric. In practice also, in order to reduce the force which has to be applied to the means for actuating the eccentric with a rotary movement, it is often necessary to reduce the amount of friction between the components of the pivotal connection. That is achieved by lubrication and also by using ball-type or roller-type rolling bearings. All those measures increase the degree of reversibility of the pivotal connection and the consequence thereof is that a thrust applied to the backrest part of the seat with a sufficient force causes the planet gear to be driven in rotation with rotary movement of the eccentric about their common axis and angular displacement of the movable ring gear and the backrest part. This is a major disadvantage, in particular in regard to a vehicle seat, as in the event of a violent impact there is the risk of the backrest part pivoting abruptly in one direction or the other. The fact that the assembly can go out of adjustment in that way, which can also be a progressive procedure by virtue of the force applied to the backrest part by a seated person and/or due to vibration from the road, is in itself a nuisance and a possible cause of accidents.

SUMMARY OF THE INVENTION

It is an object of the invention to make such pivotal connections irreversible in the situation where the diameter ratio between the large and small tooth arrays of the planet gear is at least equal to 1.05 and in most cases is between 1.05 and 2.

It is another object of the invention to achieve irreversibility of that kind, even in the situation where the pivotal connection has means for reducing parasitic frictional phenomena such as for example ball-type or roller-type rolling bearings which can be disposed between the eccentric and the planet gear or between the movable side plate and an annular bearing surface which is fixed or which forms a rolling bearing surface for the shaft which entrains the planet gear.

It is another object of the invention to retain such irreversibility, even with high levels of torque, of the order of 1000 mN, applied to the movable ring gear. Such torque values can result for example from the thrust force applied to the backrest part of a front seat of a vehicle by the occupant of a rear seat, in the event of abrupt deceleration of the vehicle.

It is another object of the invention to retain such irreversibility without having to carry out particular maintenance operations.

It is yet another object of the invention to provide such irreversibility without reducing the ease of adjustment and without substantially increasing the torque which has to be applied to the adjustment means for rotating the eccentric and therefore operating the planet gear.

The above and other objects are solved according to the present invention which can be used not only for vehicles seats or other types of seats, but can be used also for a number of devices comprising a fixed part and a movable part, which is movable with respect to the fixed part around a common axis.

An irreversible continuous pivotal connection between a fixed part and a movable part according to the invention comprises a fixed side plate fixed with respect to the fixed part and having an arcuate array of teeth, as well as a movable side plate fixed with respect to the movable part and having an arcuate array of teeth with a diameter different from that of the array of teeth of the fixed side plate. The movable side plate is mounted parallel to the fixed side plate for rotation about a fixed axis common to the side plates. A planet gear is positioned between the fixed and movable side plates, and has two axially spaced arcuate arrays of teeth each locally meshing with respective ones of the arcuate arrays of teeth of the fixed and movable side plates, the arcuate tooth arrays of the planet gear having different diameters. An eccentric member is mounted for rotation about the fixed axis and presses on the planet gear such that rotation of the eccentric member in one direction causes epicyclic rotation of the planet gear in another direction.

According to the invention, a locking disc is rotatably fixed relative to the eccentric member and is positioned between the planet gear and one of the fixed and movable side plates, so that a torque applied to the movable side plate with respect to the fixed axis causes a wall of the planet gear facing that of the locking disc to rock from an initial plane thereof by an amount sufficient to come into contact locally against the wall of the locking disc, causing frictional locking of the planet gear with respect to the locking disc and locking of the movable side plate with respect to the fixed side plate.

Preferably the distance which separates two planes which are perpendicular to the axis of the planet gear and which each cut one of the two tooth arrays thereof into two equal parts is at least equal to 1/35th of the mean diameter of those two tooth arrays.

Advantageously a locking disc is disposed on each side of the planet gear in each of the two spaces between each of the two side walls of the planet gear and the corresponding facing side walls of the fixed side plate and the movable side plate.

Advantageously also, at least one of the two side surfaces which are capable of coming to bear against each other of the planet gear and at least one locking disc is treated so as to increase its coefficient of friction.

In a particularly advantageous construction, the treatment for increasing the coefficient of friction of one or another of the surfaces of the planet gear and at least one locking disc which come to bear against each other comprises increasing the roughness of those surfaces or spraying onto those surfaces a rough material or a material with a high coefficient of friction.

Many embodiments of the irreversible pivotal connection according to the invention can be imagined, which do not fall outside the scope of the invention.

Generally, the pivotal connection according to the invention concerns all constructions in which the planet gear comprises two tooth arrays in which the ratio between the diameters thereof is at least equal to 1.05. That diameter ratio can attain and even exceed a figure of 2 while still permitting irreversibility, by virtue of the locking means according to the invention.

Although this invention is more easily applied to planet gears comprising two tooth arrays which are directed outwardly, it is also possible to envisage applying it to pivotal connections comprising a planet gear which is provided both with an outwardly directed tooth array and another inwardly directed tooth operate with the tooth arrays of two side plates which are directed in a complementary fashion. It is however necessary for the spacing between the two parallel planes which are perpendicular to the axis of the planet gear and which cut each of the two tooth arrays into two equal parts to be sufficient to permit the torque effect to cause the rocking movement of the planet gear from its initial plane, thereby causing it to come to bear against the locking disc.

It is also possible to apply the irreversible pivotal connection according to the invention to a continuous pivotal connection with automatic take-up of play, such as that in accordance with French patent application No. 8616917.

In such a pivotal connection the eccentric is provided with an elastic bearing which permits the play in the assembly to be taken up. Moreover the support for rotatably supporting the eccentric may comprise two preferred support zones which, by co-operating with the elastic bearing, make it possible to eliminate the pivotal back-lash movements of the movable part of the device, which are due to wear. The addition to such a pivotal connection of a locking disc according to the invention makes it possible to combine the advantages of irreversibility and taking up play.

Finally it is possible to reduce the friction involved and to facilitate adjustment by the use of any known means and in particular ball-type or roller-type bearings, for example between the eccentric and the planet gear or between the fixed side plate and the movable side plate, while retaining irreversibility of the pivotal connection.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
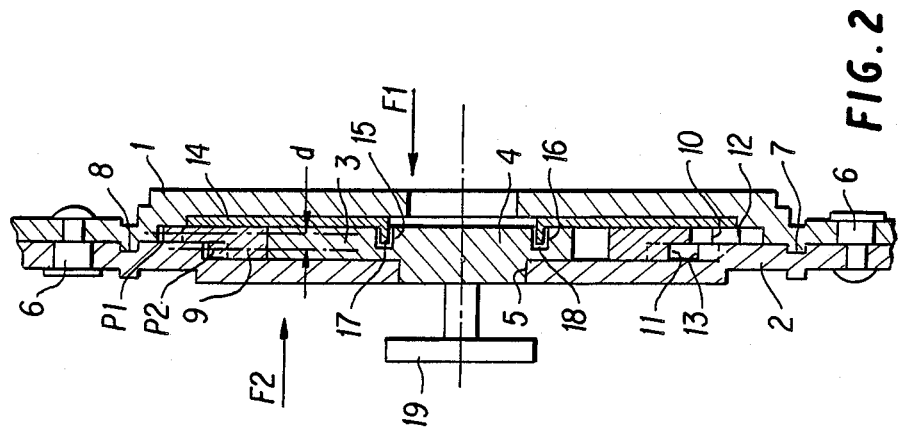
FIG. 2 is a view in section at line II—II in FIG. 1.
Figure 1:
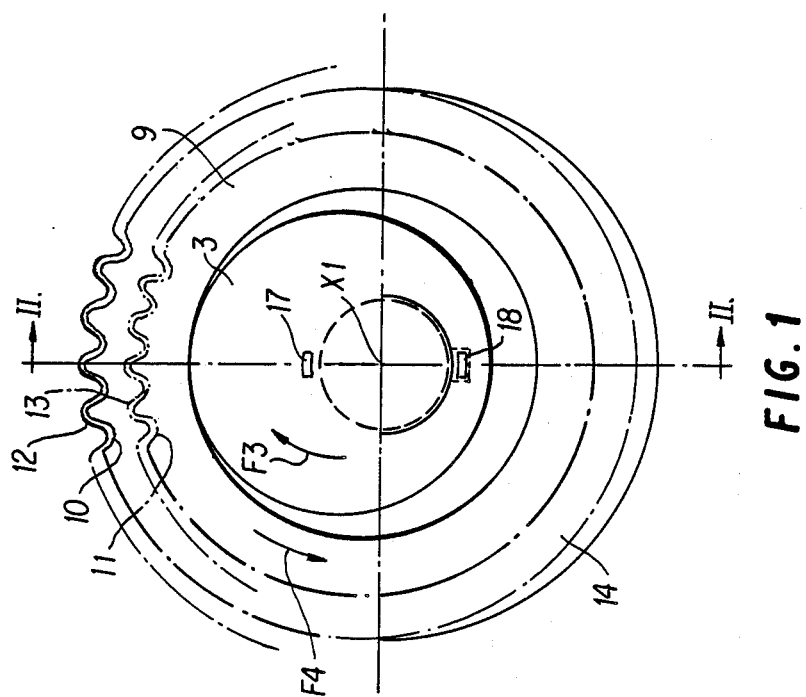
FIG. 1 is a view in the direction indicated by the arrow F1 in FIG. 2 of a locking disc according to the invention and the way in which it is connected to an eccentric housed within a planet gear.

Reference is made to FIGS. 1 and 2 showing a first embodiment of the array according to the invention, in diagrammatic form.

The array comprises in known manner a pivotal connection for a vehicle seat including a fixed side plate 1 which is connected in known manner (not shown) to the seat part of the seat and a movable side plate 2 connected to the backrest portion of the seat in a manner which is also not shown. The two side plates are pivoted about a common axis X1 - X1. An eccentric forming a cam 3 is mounted rotatably about the same axis by a shaft 4 which rests on a rotary bearing surface 5 provided in the movable side plate 2. Guides or pins as indicated at 6 are fixed to the side plate 1 and slide in arcuate slots of the side plate 2. They ensure that the two side plates are held against each other and a circular ring 7 which engages into a circular recess 8 ensures that the two side plates are centered during relative rotation. A planet gear 9 is positioned between the side plate 1 and the side plate 2. The planet gear 9 is provided with two tooth arrays 10 and 11 which are directed outwardly, the ratio between the mean diameters thereof being about 1.25.

As the eccentric 3 is rotated, its periphery bears on the planet gear at different circumferential portions thereof. The planet gear 9 is thus driven by the cam-forming eccentric 3 in such a way that its tooth arrays cooperate with the inwardly directed tooth arrays 12 and 13 of the fixed and movable side plates 1 and 2 respectively. A locking disc 14 is centered on the common axis.

This locking disc is rotationally fixed with respect to the eccentric 3 by virtue of connecting means formed by lugs or projections 15 and 16 which engage into recesses 17 and 18 provided in the eccentric 3.

The diameter of the locking disc 14 is such that it covers the major part of the side surface of the planet gear 9 which faces the corresponding side surface of the locking disc.

The opposite side surface of the locking disc is disposed facing the corresponding side surface of the fixed side plate 1.

As shown in FIG. 2, the space between the planet gear and the fixed side plate 1 is just sufficient to accommodate the locking disc 14 with the play required to permit adjustment of the pivotal connection by means of an adjustment knob 19 without excessive friction.

In FIG. 1, the upper half of the locking disc 14 has been removed to show the zones of meshing engagement of the tooth arrays 10 and 11 of the planet gear 9 with the tooth arrays 12 and 13, which are shown in purely diagrammatic form, of the two side plates, under the action of the cam-like eccentric 3.

It will be seen that rotary movement of the eccentric in the direction indicated by the arrow F3 entrains the planet gear with the side plates 1 and 2 so as to produce a rotary epicyclic movement of the planet gear in the opposite direction, as indicated by the arrow F4. Since the arrays of teeth 10 and 11 of the planet gear are spaced in the axial direction, a torque applied to the movable side plate will result in rocking of the planet gear 9 out of its initial plane, i.e., out of the plane of FIG. 1. This rocking occurs about an axis in the plane P1 of the planet gear and passing through the region of meshing of the planet gear with the plates 1 and 2. The rocking arises due to the moment produced by applying a force at teeth 11 and 13 which are spaced by spacing "d" from the stationary teeth 12; It will be appreciated that, when the planet gear 9 so rocks from its plane under the action of a torque applied to the movable side plate 2, with respect to the axis X1—X1, the side wall thereof comes into frictional contact locally against the side wall of the locking disc 14, which is in frictional contact with the inside wall surface of the fixed side plate 1.

The fact that the side walls which frictionally bear against each other, of the planet gear and the locking disc, perform a rotary movement in mutually opposite, directions in response to a torque force which is applied by the eccentric 3 permits an effective locking action to be produced, the level of effectiveness of the locking action increasing proportion to an increasing pressure applied by the planet gear 9 to the locking disc 14 and by the locking disc 14 to the fixed side plate 1, in the contact zone of the assembly. That, therefore, ensures that the backrest part of the seat is held in its angular position relative to the seat part.

It will be appreciated that the locking effect increases in proportion to the increased diameter of the locking disc 14 and its area facing the planet gear 9.

The pressure applied by the planet gear to the locking disc depends on the torque applied to the movable side plate 2 and the distance "d" between the two planes P1 and P2 which are perpendicular to the common axis X1—X1 and which each cut one of the tooth arrays 10 and 11 of the planet gear into two equal parts. That distance "d" must be at least equal to 1/35th of the mean diameter of those two tooth arrays. Experience has shown that when that distance "d" is at least equal to 1/35th, no measurable relative angular displacement between the movable side plate and the fixed plate is observed, for any torque applied to the movable side plate, with respect to the axis X1—X1, in the range of between 100 and 1000 mN.

Figure 3:
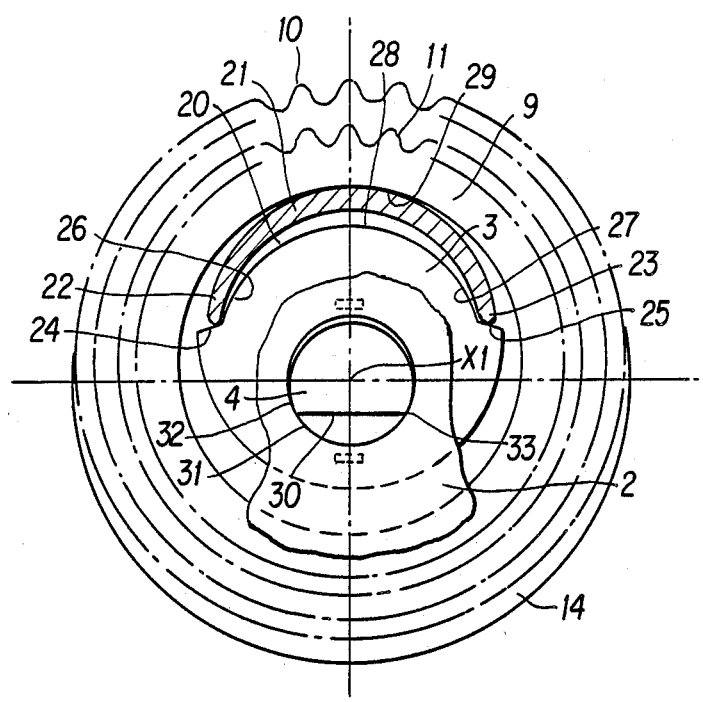
FIG. 3 is a view, partly in section, in the direction indicated by the arrow F2 in FIG. 2 of a modified embodiment having means for automatically taking up play, accommodated as in the case in FIG. 1 within a planet gear and fixed by connecting means to a locking disc.

FIG. 3 is a view in the direction indicated by the arrow F2 in FIG. 2 of a particular embodiment of the array according to the invention in which a means for automatically taking up play or clearances is incorporated in the array, such automatic play take-up means itself being the subject-matter of French patent application No. 8616917. As shown in FIG. 3 the relative arrays of the cam-forming eccentric 3, the planet gear 9 and the locking disc 14 are the same and the connection between the locking disc and the eccentric by means of projections and recesses is unchanged. In order to simplify the drawing, the fixed side plate 1 is not shown. As illustrated in FIG. 3 the upper zone of the cam-forming eccentric has a recess 20 occupied by an elastic metal bearing member 21 whose reduced-thickness ends 22 and 23 are limited in displacement by the step portions 24, 25 of the eccentric and bear against the zones 26 and 27 of the eccentric. Moreover the elastic bearing member is not applied against the upper zone 28 of the eccentric and instead applies an elastic pressure against the wall 29 of the bore of the planet gear, forming a rotationally symmetrical bearing surface. Moreover the shaft 4 of the eccentric 3 has a flat 30 so as to bear against the wall 31 of the bore in the movable side plate 2, of which only the region adjacent to the axis is shown, at two preferred support zones 32 and 33 which, in the construction shown in FIG. 3, are disposed at approximately 120° relative to each other with respect to the common axis X1. That angle may be selected preferably to lie between 90° and 150°. Such a structure ensures stability of the pivotal connection and provides for a wear take-up action. That results in silent operation and the elimination of the risk of pivotal back-lash movement of the backrest part of the seat after a certain period of use.

As stated hereinbefore, it is possible to reduce the frictional effects of the various components of the pivotal connection by using any known means and in particular by virtue of using ball-type or roller-type rolling bearings. Such rolling bearings may be fitted in particular between the cam-like eccentric and the planet gear or between the movable side plate and the fixed side plate or any other fixed surface against which it bears. By virtue of the locking disc it is possible nonetheless to retain the irreversibility aspect.

Generally speaking, the irreversible continuous pivotal connection according to the invention can be applied to any device comprising two parts: one fixed, the other movable with respect to the fixed one around a common axis, the inclination of the movable part with respect to the fixed part having a possibility of irreversible continuous adjustment.

The irreversible continuous pivotal connection according to the invention can thus be applied to some types of beds having an adjustable backrest, or to any other devices.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An irreversibly continuous pivotal connection between a fixed part and a movable part, comprising:
    a fixed side plate fixed with respect to said fixed part and having an arcuate array of teeth;
    a movable side plate fixed with respect to said movable part and having an arcuate array of teeth;
    means for mounting said movable side plate parallel to said fixed side plate for rotation about a fixed axis common to said fixed and movable side plates;
    a planet gear positioned between said fixed and movable side plates, said planet gear having two axially spaced, arcuate arrays of teeth each locally meshing with respective ones of said arcuate arrays of teeth of said fixed and movable side plates, the arrays of teeth of said planet gear having diameters different from one another;
    an eccentric member mounted for rotation about said fixed axis and pressing on said planet gear such that rotation of said eccentric member in one direction causes epicyclic rotation of said planet gear in another direction;
    a locking disc rotatably fixed relative to said eccentric member and positioned between said planet gear and one of said fixed and movable side plates, wherein a torque applied to said movable side plate with respect to said fixed axis causes a wall of said planet gear facing that of said locking disc to rock from an initial plane thereof by an amount sufficient to come into contact locally against said wall of said locking disc, causing frictional locking of said planet gear with respect to said locking disc and therefore locking of said movable side plate with respect to said fixed side plate.

2. A pivotal connection according to claim 1 wherein said locking disc is so disposed that when said wall of said planet gear comes into contact against said side wall of said locking disc, another side wall of said locking disc comes into contact against a facing side wall of said one of said side plates.

3. A pivotal connection according to claim 1 wherein a distance which separates two planes which are perpendicular to said fixed axis and which each cut one of said arcuate arrays of teeth of said planet gear into two equal parts is at least equal to 1/35th of a mean diameter of said arrays of teeth of said planet gear.

4. A pivotal connection according to claim 1 wherein said wall of said planet gear and said wall of said locking disc are surface treated so as to have increased friction.

5. A pivotal connection according to claim 1 including an elastic bearing member positioned between said eccentric member and said planet gear for applying a radial elastic bearing force against said planet gear.

6. A pivotal connection according to claim 5 wherein said eccentric member is mounted on a shaft journaled in one of said side plates, wherein said shaft has a flat portion sized such that said shaft bears on said one of said side plates at two preferred contact zones which are angularly spaced by between 90° and 150°.

7. A pivotal connection according to claim 6 wherein said flat portion is positioned circumferentially opposite said elastic bearing member, whereby gear back-lash and bearing play are taken up.

8. A pivotal connection according to claims 1 wherein a ratio between said mean diameters of said arcuate arrays of teeth of said planet gear is at least equal to 1.05.

9. A pivotal connection according to claim 8 wherein said ratio is not substantially greater than 2.

10. A pivotal connection according to claim 1 in combination with said fixed and movable parts, wherein said fixed and movable parts are respectively a fixed seat portion and movable backrest of a seat.

11. A pivotal connection according to claim 1 in combination with said fixed and movable parts, wherein said fixed and movable parts are respectively a fixed bed portion and movable backrest of a bed.

12. A pivotal connection according to claim 1 including rolling bearings between said eccentric member and said planet gear.

* * * * *